April 2, 1963  P. NAUMANN ET AL  3,083,627
MONOCULAR REFLEX CAMERA

Filed Dec. 26, 1961  11 Sheets-Sheet 1

Fig. 1

INVENTORS
PAUL NAUMANN
BY LUDWIG LEITZ

Toulmin & Toulmin
Attorneys

Fig. 3

April 2, 1963  P. NAUMANN ET AL  3,083,627
MONOCULAR REFLEX CAMERA
Filed Dec. 26, 1961  11 Sheets-Sheet 4

Fig. 4

INVENTORS
PAUL NAUMANN
BY LUDWIG LEITZ
Toulmin & Toulmin
Attorneys

April 2, 1963    P. NAUMANN ET AL    3,083,627
MONOCULAR REFLEX CAMERA
Filed Dec. 26, 1961    11 Sheets-Sheet 10

Fig. 8

INVENTOR
PAUL NAUMANN
BY LUDWIG LEITZ
Toulmin & Toulmin
Attorneys

United States Patent Office 3,083,627
Patented Apr. 2, 1963

3,083,627
MONOCULAR REFLEX CAMERA
Paul Naumann and Ludwig Leitz, Wetzlar (Lahn), Germany, assignors to Ernst Leitz Gesellschaft mit beschränkter Haftung, Wetzlar (Lahn), Germany
Filed Dec. 26, 1961, Ser. No. 162,036
Claims priority, application Germany Jan. 11, 1961
12 Claims. (Cl. 95—42)

The present invention relates to a monocular reflex camera, more particularly, to an arrangement for pivoting a mirror from its view finder position in the path of the light rays entering through the objective to its exposure position wherein the mirror is out of the path of said light rays and vice versa by spring means responsive to the actuation of the shutter.

In the conventional monocular reflex camera the pivoting mirror is pivoted between its two end positions which are defined by stop members. The mechanism for pivoting of the mirror comprises complex lever systems which are provided with a plurality of driving springs to carry out the individual control and driving functions.

Such reflex cameras have also been provided for the use of interchangeable objectives such as those adjustable diaphragms wherein the opening may be preselected. This adjustment of the diaphragm opening is responsive to the pivoting of the mirror and is carried out by additional members of the lever systems.

These lever systems are devised so that the mirror is pivoted out of the path of light rays entering through the objective only during that period of time which is required for the exposure. Thus, the function of the view finder arrangement is interrupted for as short a period of time as consistent with the photographic conditions.

In addition, the use of the preselected adjustable objective diaphragm assures that the maximum diaphragm opening is always available when the mirror is in the view finder position.

One of the disadvantages of the above-mentioned known reflex cameras is that the lever systems require a plurality of driving springs so that, in many cases, these springs act against each other. As a result, the strength of these springs must be considerably greater than the strength actually required for carrying out the functions in order to ensure that the various related functions of the lever systems are performed. Because of these excessive spring strengths, considerable quantities of spring tension are available in the end positions of the lever systems and the mirror and these spring tensions act against the stop members which limit the end positions of the lever systems and the mirror. These forces against the stop members produce shocks and noises in the camera which are not only unpleasant for the operator but which make such cameras unsuitable for many purposes such as pictures of animals, children or when the camera is mounted on a fixed support.

In addition, these complicated lever systems with their plurality of individual spring drives are susceptible to trouble particularly so since the components of the lever systems are manufactured as light as possible in order to reduce the total weight thereof.

It is therefore the principal object of the present invention to provide a novel and improved monocular reflex camera.

It is an additional object of the present invention to provide a monocular reflex camera wherein the lever system for pivoting the mirror between the exposure and view finder positions is greatly simplified and operates with a minimum of vibrations and noises.

It is another object of the present invention to provide a monocular reflex camera wherein only a single driving spring is employed for the lever system which pivots the mirror between the view finder and exposure positions.

In the camera of the present invention the pivoting movements of the mirror are obtained through a crank guide lever system. In this system the mirror is mounted upon a frame which has a slot therein. A pivotally mounted crank arm has a pin on one end thereof which is slidably received in the frame slot. This lever system is so constructed that the dead center positions of the crank occur when the mirror is in its end positions, i.e. the viewing and exposure positions.

The crank is connected by a control lever to a main lever which is pivotally mounted on a wall of the casing. There is an auxiliary lever which is also pivotally mounted on a wall of the casing coaxially with said main lever and which is operatively connected to the main lever by a coupling lever.

The only driving spring for the lever system comprises a straight torsion spring which is mounted coaxially with said main and auxiliary levers and has one arm fixedly connected to the casing while the other arm acts upon the coupling lever.

In order to tension the driving spring, the auxiliary lever is provided with a tensioning arm which is engageable with a cam mounted on the main shaft of the gear system for the shutter tensioning and film-feeding mechanism. Thus, when the shutter is returned to its original position after an exposure, and the film is moved to permit a new exposure thereon, the operation of this shaft will actuate the tension arm to cock the driving spring.

Blocking levers are provided to block the operation of the main and auxiliary levers, respectively. These blocking levers are actuated in response to the operation of the shutter. No locking levers or stopping means are necessary for the end positions of the mirror since these end positions result from the dead center positions of the crank guide lever system. As a result, the mirror will reach its end positions with a minimum of force and thus vibrations and shocks will be reduced to a minimum.

Structure is provided so that the mirror may function in one of several different ways.

(a) The mirror can be pivoted to the exposure position and returned to the view-finding position after each exposure.

(b) The mirror can be pivoted to its exposure position for an exposure and locked in position to prevent its return to the view-finding position.

(c) The mirror may be pivoted to its exposure position and remain in the exposure position for a series of exposures.

In addition, the lever system comprises structure to ensure the release of the camera shutter only after the mirror has been pivoted to its exposure position out of the path of light rays entering through the camera objective.

Other objects and advantages of this invention will be apparent upon reference to the accompanying description when taken in conjunction with the following drawings, wherein.

A specific embodiment of the present invention will next be described in detail with reference to the drawings wherein like reference symbols indicate the same parts throughout the various views. Illustrated in the drawings is a monocular reflex camera of the type having a focal plane shutter and a preselective adjustable diaphragm in an interchangeable objective. It is to be borne in mind, however, that other types of monocular reflex cameras can readily employ the invention disclosed herein.

To facilitate the explanation of the structure of the invention, the general construction of the camera will first be described, then related groups of components, the operation of the invention, and several modifications of the lever system.

General Construction

With particular reference to FIGURES 1 through 6a, the reflex camera illustrated therein comprises a casing 10 having an interior casing 11 with casing walls 11a, 11b and 11c defining a space 11d. There is a further casing wall 11e and the casing wall 11b has an image opening 11f therein.

The enclosed space 11d is closed on the top thereof by an adjusting plate 13 in association with a condensing lens 14. Mounted above the lens 14 is a pentaprism 15 of the reflex view finder and illustrated in FIGURE 4.

On the top surface of the camera casing 10 there is provided a time exposure adjusting button 16 and a rewind button 17 having a rewind or magazine shaft 17a. Coaxially to the button 17 there is provided another adjusting means 17b for a further photographic factor such as film sensitivity, filter or the like. The values as indicated by the adjusting button 17b influence an exposure meter which is built into the camera casing and comprises a photoelectric cell 18 positioned on the front wall of the camera casing 10 above an interchangeable objective 19.

No further details of the above-described structure are deemed to be necessary since they are conventional.

A conventional focal plane shutter 20 having shutter plates 20a and 20b is mounted in the casing 10. Specifically, the focal plane shutter 20 is mounted on the outer faces of the casing walls 11a, 11b and 11c.

The focal plane shutter 20 is coupled in a known manner with the film-feeding spool, which is not illustrated in the drawings, and with a film take-up spool 21. An operating lever 22 is provided which functions to both tension or cock the shutter and to feed the film. The lever 22 operates through a gear system 23, 24 and 24a, a main operating shaft 25 of the shutter actuating system, and gears 26 and 27 which are freely rotatable on the shaft 25.

A control roller 30 is rotatably mounted on the shaft 25 and is driven by a helical spring 31 for controlling the release of the focal plane shutter plates 20a and 20b in response to a predetermined exposure time.

Figure 1:
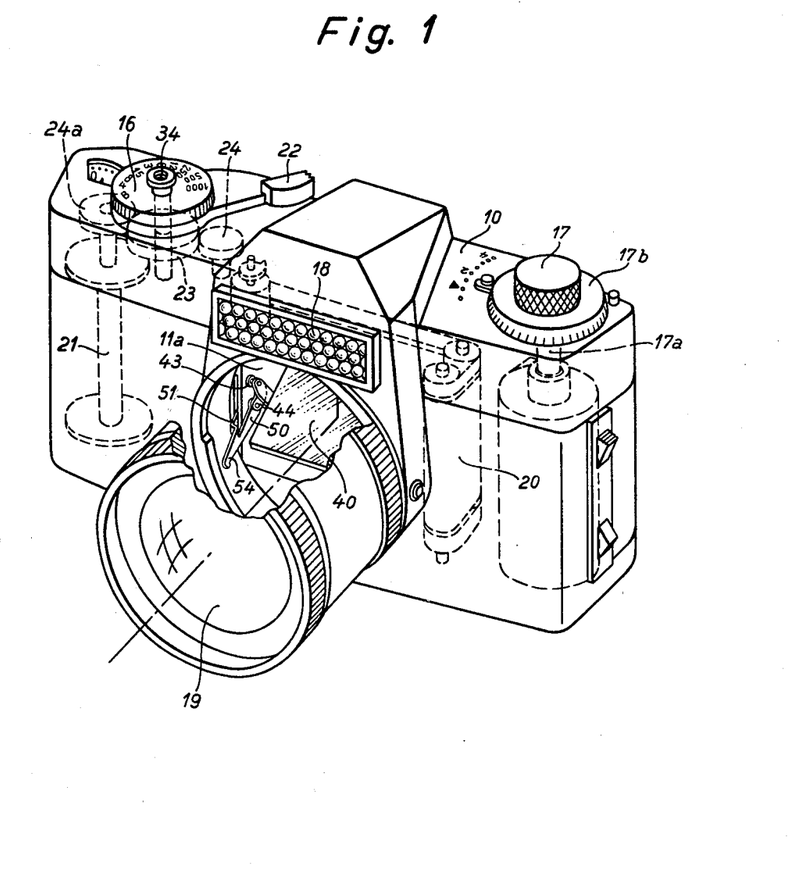
FIGURE 1 is an overall perspective view with cutaway portions of a monocular reflex camera having a focal plane shutter and an interchangeable objective with a preselected adjustable diaphragm.
Figure 2:
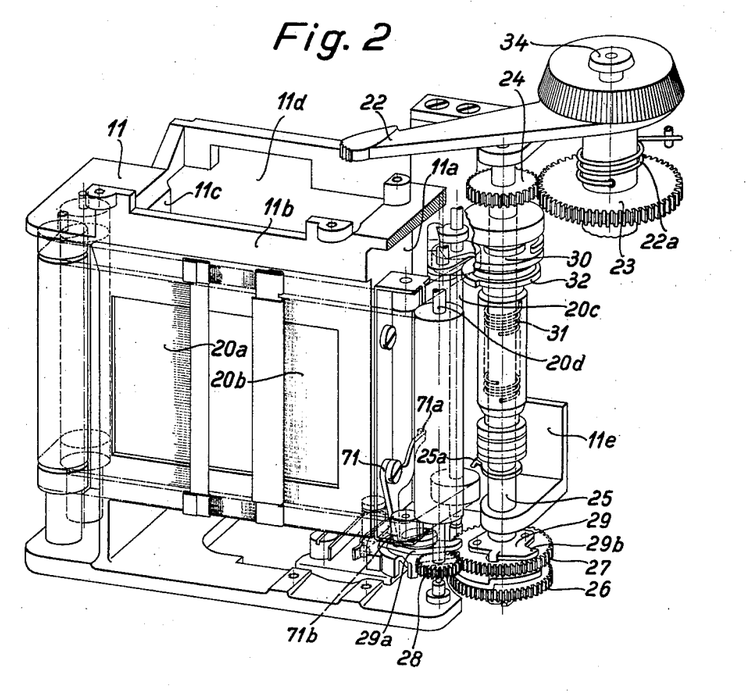
FIGURE 2 is an overall perspective view of the focal plane shutter and the structure for cocking the same.
Figure 3:
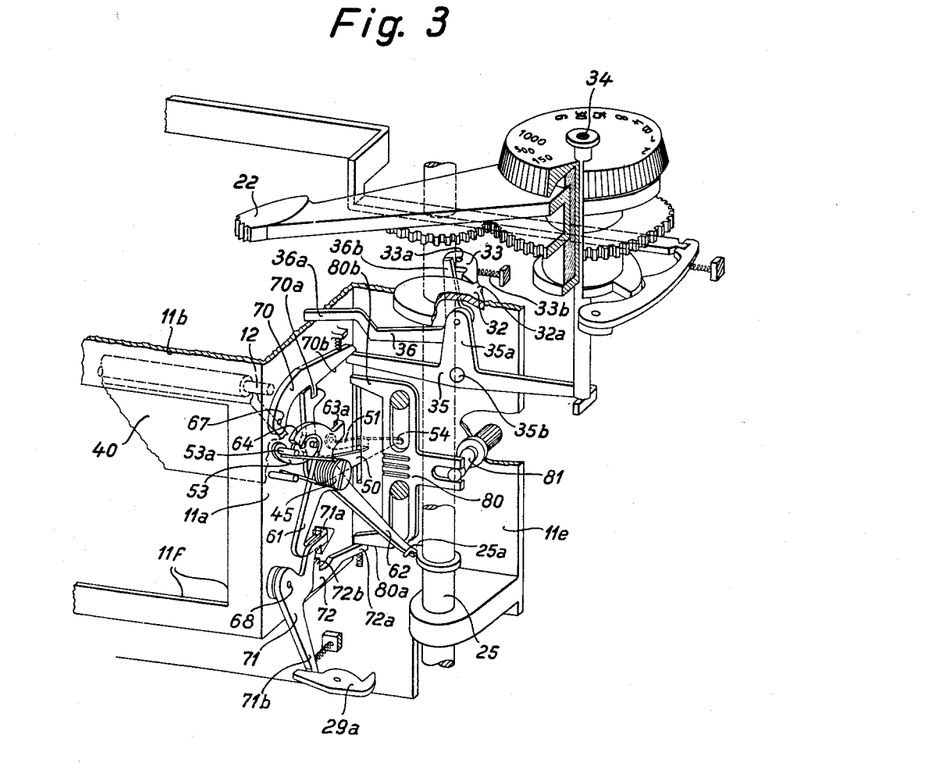
FIGURE 3 is a perspective view of the lever system for the pivoting of the mirror with the mirror being shown in the view-finder position.

A blocking plate 32 is connected with the control roller 30 and has a cam 32a thereon which is engageable with a pawl 33 rotatably mounted about an axis 33a which is fixedly mounted on the casing. (FIGURES 2 and 3).

A spring 33b urges the pawl 33 into engagement with the blocking plate 32 but is disengageable therefrom by actuating the camera release rod 34 which is coaxial with the exposure time adjusting member 16. The lower end of the release rod 34 engages one arm of a T-shaped lever 35 which is pivotally mounted at 35b. The stem of the lever 35 is indicated at 35a and has a crank lever 36 pivoted thereon. One arm 36a of the crank lever extends into the range of pivoting movement of the mirror and the other arm 36b is engageable with the pawl 33 to release the same from the cam 32a.

This arrangement ensures that the actual release of the shutter after actuation of the camera release rod 34 occurs only after the mirror 40 has reached its exposure position and engages the arm 36a of the crank lever 36. When the release rod 34 is depressed, the crank lever 36 is moved to a position for releasing the pawl 33 because of the pivoting movement of the lever 35 about its axis. The pawl 33, however, is not yet released. The pawl 33 is released only after the mirror 40 pivots to its exposure position and engages the lever arm 36a to cause the lever arm 36b to disengage the pawl 33 from the cam 32a.

Unidirectional clutches are provided between the gear 27 and the gear 26 and between the gear 26 and the shaft 25. These clutches are not illustrated but are engageable only in the direction of tensioning or cocking of the shutter so that when the lever 22 is operated, the gears 26 and 27 will be driven for cocking the shutter and feeding the film. However, the gears 26 and 27 are freely rotatable in the opposite direction for release of the shutter.

The gear 26 is connected through suitable gearing with the shaft 20c of the shutter plate 20a which is first released. Gear 27 is drivingly connected with the shaft 20d of the subsequently released shutter plate 20b through a gear 28. In addition, gear 27 is connected with a cam plate 29 which is engageable with a switch lever 29a pivotable about a stationary axis. The lever 29a operates to control the return of the mirror to its view-finder position in response to the release of the shutter.

Lever System for Actuation of the Mirror

The mirror 40 is mounted on a frame 40a which is pivotally mounted upon a shaft 12 located in the space 11d. The frame 40a has a guide slot 41 which slidably receives a crank pin 42a of a crank 42 which is pivotally mounted at 43 on the casing wall 11a. The crank 42 is on the inner side of the casing wall 11a within the space 11d as may be seen in FIGURES 1, 3, 4 and 6.

The positions of the shaft 12 and the pivot point 43 as well as the arrangement of the slot 41 are so selected that the view-finder and exposure positions of the mirror 40 correspond to the dead center positions of the crank pin 42a opposing the slot 41. In this arrangement the crank 42 with the crank pin 42a and the frame 40a together with the guide slot 41 comprise a crank guide lever system.

Figure 4:
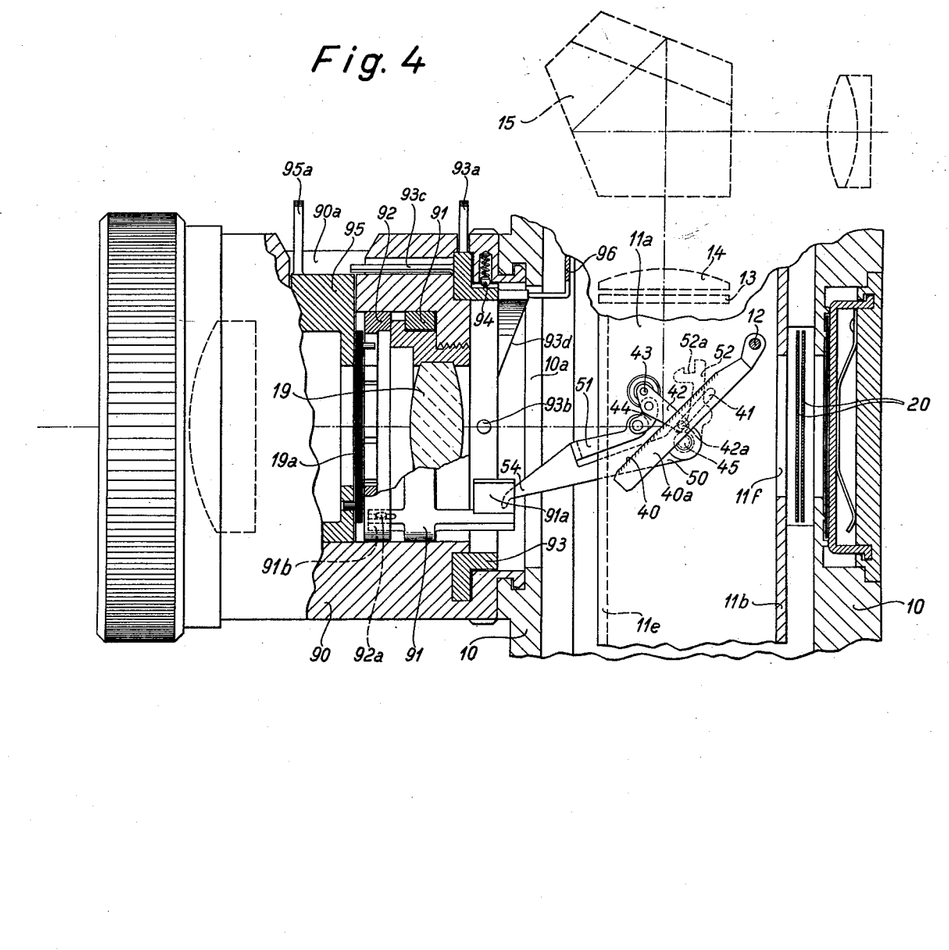
FIGURES 4 and 4a are transverse sectional views through the camera casing showing the positions of the lever system components when the mirror is in the view-finder position.
Figure 6:
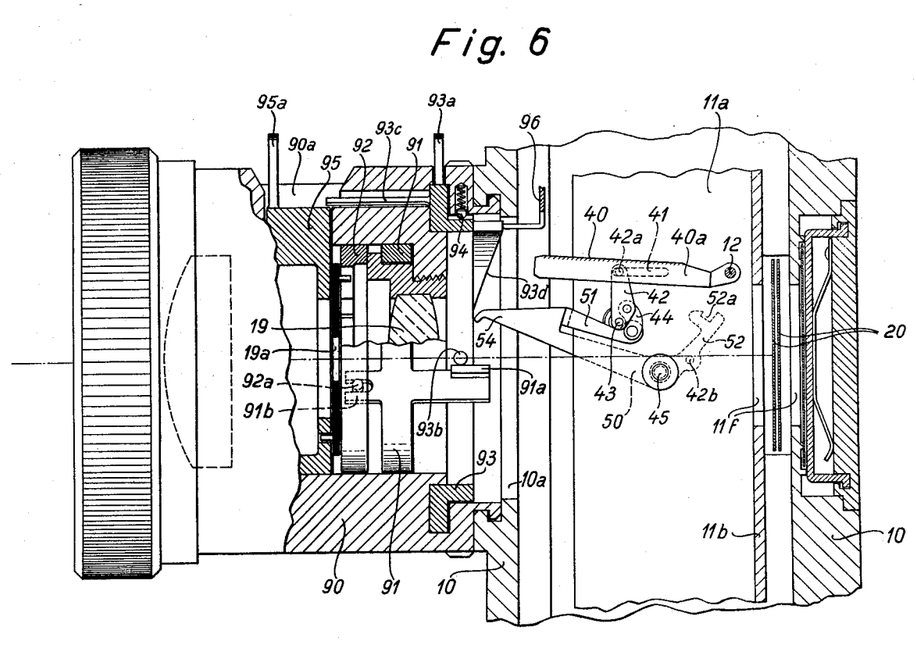
FIGURES 6 and 6a are views similar to that of FIGURES 4 and 4a but showing the position of the components when the mirror is in the exposure position.

A main lever 50 is pivotally mounted at 45 on the outer side of the casing wall 11a facing the operating shaft 25. The main lever 50 has a lever arm 51 which is bent to extend into the casing space 11d and is connected to the crank 42 by a control lever 44. The main lever also has a lever arm 52 which has a blocking slot 52a in the upper end thereof and a pivot point 52b upon which is pivotally mounted a coupling lever 53. The coupling lever 53 has a pin 53a on its free end and further has a cam-like projection 53b between the pin 53a and the pivot point 52b. Further, the main lever 50 has a lever arm 54 which, in effect, is an extension of the lever arm 51 but which extends into the opening 10a of the camera casing 10 in which is mounted the objective (FIGURES 4 and 6).

An auxiliary lever 60 is pivotally mounted at 45 coaxially to the main lever 50 and is provided with a lever arm 61 having blocking abutments 61a and 61b arranged in substantially an arrowhead shape. Also extending from the auxiliary lever 60 is a tensioning arm 62, a stop arm 63 having a stop member 63a on the end thereof, and a coupling arm 64. The stop member 63a is engageable with the main lever 50. The coupling arm 64 cooperates with the projection 53b of the coupling lever 53.

A torsion spring 65 is also mounted on the pivot shaft 45 coaxially with the main lever 50 and the auxiliary lever 60. The torsion spring 65 has a spring arm 65a which rests against an abutment 66 on the casing wall 11a and a spring arm 65b which is in contact with the pin 53a of the coupling lever 53. Under the action of the spring 65 the coupling arm 64 and the projection 53b are in continuous positive connection with each other.

The tensioning arm 62 of the auxiliary lever 60 is engageable with a cam 25a mounted on the main shaft 25 of the shutter actuating system. The shafts 45 and 25 are so positioned that their extended axes intersect each other. As a result of this arrangement the cam 25a actuates the tensioning arm 62 to cock the spring 65 when the shutter is being tensioned and the film is being fed.

Above and below the shaft 45 and diametrically opposed from each other there are fixedly mounted on the casing wall 11a pivot points 67 and 68 upon which are pivotally mounted locking levers 70, 71 and 72.

The locking lever 70 which is pivoted at 67 has a tongue 70a which is engageable with the blocking slot 52a of the lever arm 52. A spring 70c urges the locking lever 70 towards the lever arm 52. In addition, the locking lever 70 at its lever end 70b is positively connected with the T-shaped lever 35. Pivoting of the T-shaped lever 35 under the action of the release rod 34 will raise the locking lever 70 to disengage the tongue 70a from the blocking slot 52a of lever arm 52.

The locking lever 71 is pivoted at 68 and has a lever arm 71a which is engageable with the stop 61a of the lever arm 61 of the auxiliary lever 60 together with a lever arm 71b which is engageable with the cam plate 29 through the switch lever 29a.

There is an auxiliary locking lever 72 coaxially mounted with respect to the locking lever 71 and having a projection 72b which is engageable with the stop 61b of the lever arm 61 of the auxiliary lever 60. In addition, the auxiliary locking lever 72 is engageable by an adjustable slide bar 80 which is slidably mounted on the casing wall 11e. There is a spring 73 which acts against both the locking lever 71 and the auxiliary locking lever 72 so as to maintain the lever arm 72a in engagement with the slide bar 80 and to maintain the lever arm 71b in contact with the switch lever 29a.

The switch lever 29a which is pivotally mounted above a stationary axis is engaged by the cam plate 29 which is mounted upon the gear 27. The cam plate 29 is thus actuated by the release of the second shutter plate 20b in such a manner, that the abutment 29b thereon engages the switch lever 29a which, in turn, actuates the locking lever 71 at the end of the release movement of the second shutter plate 20b. In addition, this movement disengages the lever arm 71a from the stop 61a of the auxiliary lever 60 so as to permit the return of the mirror 40 to the view-finder position.

*Control Device for Different Positions of the Mirror*

Figure 8:
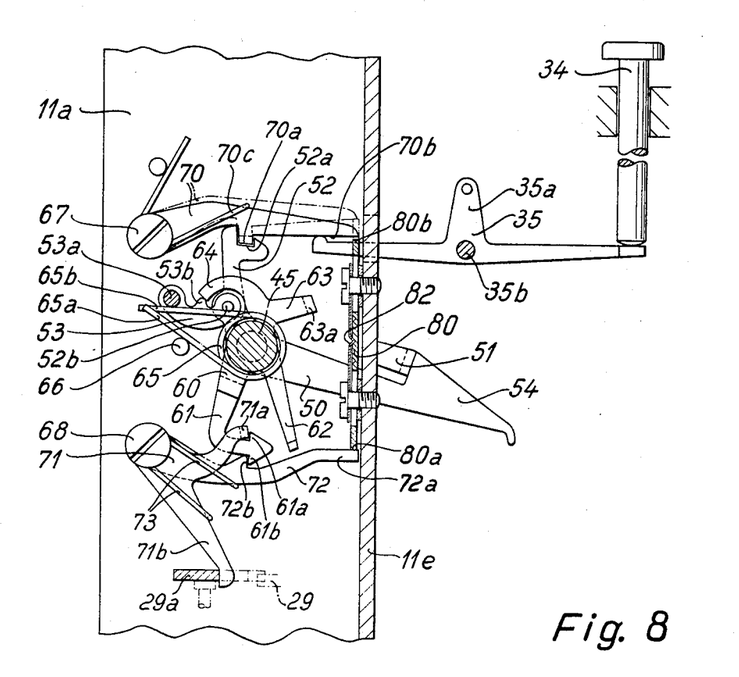
FIGURE 8 is a view similar to that of FIGURE 7 but further illustrates an adjustable slide bar for obtaining particular positions of the mirror.

The adjustable slide bar 80 which is movably mounted upon the casting wall 11e has one end 80a engageable with the lever arm 72a and the other end 80b engageable with the lever arm 70b. The slide bar 80 can be adjustable to a plurality of positions and fixed in these positions by a resilient detent 82 engageable with a plurailty of grooves on the face of the slide bar 80. The actual movement of the slide bar 80 is accomplished by a cam lever 81 which is operable from the exterior of the camera casing 10. (FIGURES 3, 4 and 8).

The first or lowermost operating position of the slide bar 80 corresponds to the normal position of operation of the mirror wherein, after each release of the shutter, the mirror is pivoted from the viewfinder position to the exposure position and, at the end of the shutter release, the mirror is automatically returned to the view-finder position. In this position (FIGURES 1 through 7) the projection 72b of the auxiliary locking lever 72 is disengaged from the stop 61b of the auxiliary lever 60. The locking lever 70 is unaffected in the lowermost position of the slide bar 80.

The second, or middle position of the slide bar 80 will permit the mirror 40 to be pivoted from its view-finder position to the exposure position upon release of the shutter, but the mirror will remain in the exposure position at the end of the shutter release. In this position the nose 72b engages the stop 61b of the auxiliary lever 60 but the slide bar 80 does not affect the locking lever 70 (FIGURE 8, the solid line position of the locking lever 70). In this position of the slide bar, the auxiliary locking lever 72 remains engaged with the lever arm 61 of the auxiliary lever 60 so that upon actuation of the camera release rod 34 the mirror 40 pivots from the view-finder position to the exposure position and remains there. This operation of the mirror is desirable when making a series of exposures wherein the camera can be adjusted through the view finder for the first exposure and the subsequent exposures follow so closely that it is not desirable to use the view finder arrangement after each of the exposures. One application would be in a camera which is motor-driven for cocking the shutter and for feeding the film.

The third and uppermost position of the slide bar 80 results in immediately positioning the mirror into its exposure position under the action of the drive spring 65 of the lever system. In this position the auxiliary blocking lever 72 continues to effectively block the auxiliary lever 60. At the same time, however, the locking lever 70 is moved to the dot-dash position as shown in FIGURE 8 and its projection 70a disengaged from the blocking slot 52a of the lever arm 52. As a result, the spring 65 will pivot the mirror 40 from the view-finder position into the exposure position and the mirror 40 will remain in this position. This position of the slide bar eliminates the use of the mirror 40 when objectives are used having a short focal length which, when extended into the space 11d, result in the mirror 40 being out of the exposure path of the light rays entering the objective.

*Preselective Adjustable Diaphragm Arrangement*

Figure 5:
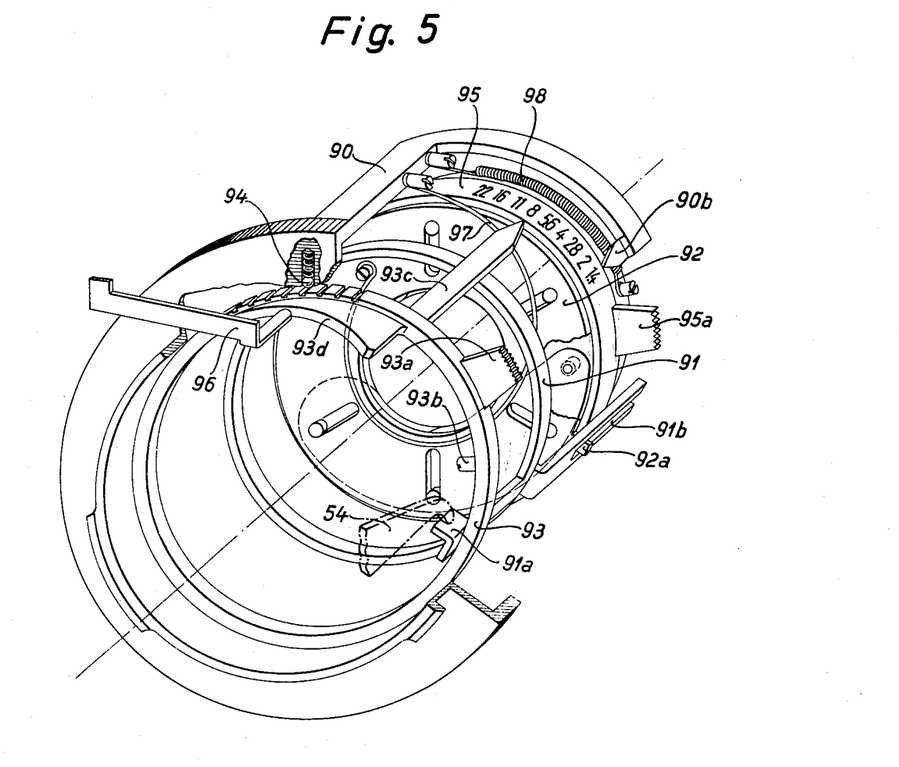
FIGURE 5 is an exploded perspective view of an adjustable diaphragm arrangement for the objective.

As seen in FIGURES 4, 5 and 6 the lever arm 54 of the main lever 50 is engageable by the structure of the adjustable diaphragm arrangement when the objective 19 is assembled in the camera casing 10. This objective will comprise an adjusting ring 91 having a stop member 91a thereon which is engageable by the end of the lever arm 54. The ring 91 is rotatably mounted in the objective mount 90 and is operatively connected to the diaphragm lamination actuating ring 92 through a coupling fork 91b and a pivot pin 92a.

A diaphragm opening preselection ring 93 is rotatably mounted on the objective mount 90 coaxial to the adjusting ring 91. The preselection ring 93 can be adjusted and fixed in different positions by means of a handle 93a extending through the objective mount 90 and a resilient ball detent 94. Further, the ring 93 has a pin 93b which is in the path of the stop member 91a on the adjusting ring 91. Dependent on the rotative displacement of the preselection ring 93 by means of a handle 93a the distance between the pin 93b and the stop member 91a can be adjusted according to the determined size of the diaphragm opening.

The preselection ring 93 is also provided with an axially extending pointer arm 93c which cooperates with a diaphragm opening scale on a graduated ring 95 which is also operatively connected to the adjustable diaphragm 19a. The diaphragm opening scale is visible through an opening 90a in the objective mount 90. The pointer arm 93c indicates with respect to this scale the diaphragm opening to which the preselection ring 93 has been adjusted. The diaphragm opening also can be manually adjusted independently from the actuation of the adjusting rings 91 and 92 by manipulation of the handle 95a.

The preselection ring 93 is provided with a cam surface 93d which coacts with a scanning lever 96 of a built-in exposure meter or exposure regulator wherein this lever transfers the diaphragm value in a known manner.

A spring 97 is connected to the adjusting ring 92 and urges this ring in the direction of the smallest opening of the diaphragm 19a. There is also a spring 98 which acts upon the ring 95, which tends to maintain this graduated ring in a position corresponding to the maximum opened position of the diaphragm 19a. In this position a pointer 90b which is on the objective mount 90 points to the greatest diaphragm opening of the graduated ring 95 when this ring is in its basic or normal position.

Operation of the Camera (a) Pivoting of the mirror for each exposure.

Figure 4A:
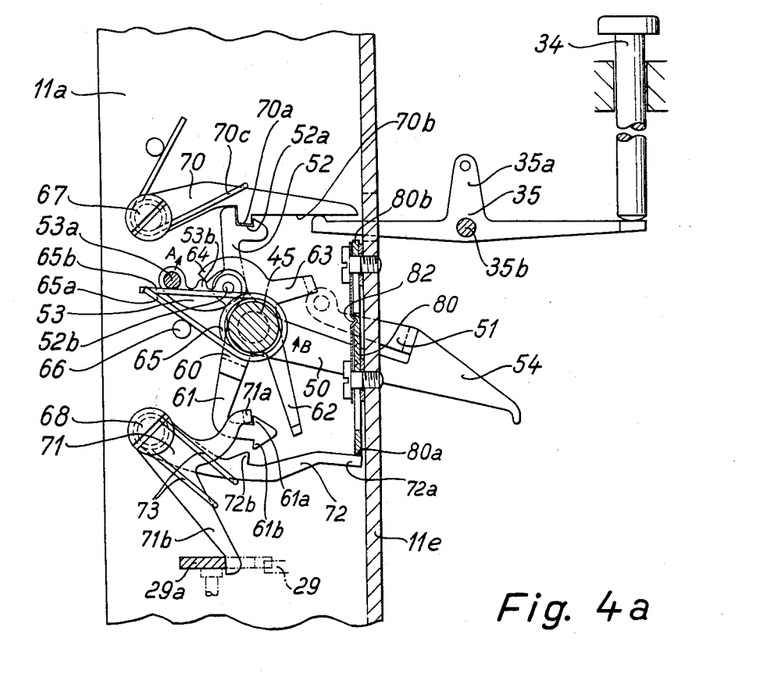

In describing the operation of the camera, it is assumed that the camera is ready for exposure with the focal plane shutter 20 being tensioned and the mirror 40 and its lever system being in the positions as shown in FIGURES 4 and 4a, i.e. the view-finder position. The diaphragm spring 97 is also under tension, diaphragm 19a is in its maximum opened position, the pin 93b of the preselection ring 93 is positioned at a distance from the stop member 91a, which corresponds to the preselected diaphragm value. (FIGURES 4 and 5.) The locking levers 70 and 71 lock the main lever 50 and auxiliary lever 60. The driving spring 65 is under tension and the adjustable slide bar 80 is in its lowermost position wherein the auxiliary locking lever 71 is disengaged from the auxiliary lever 60.

Figure 6A:
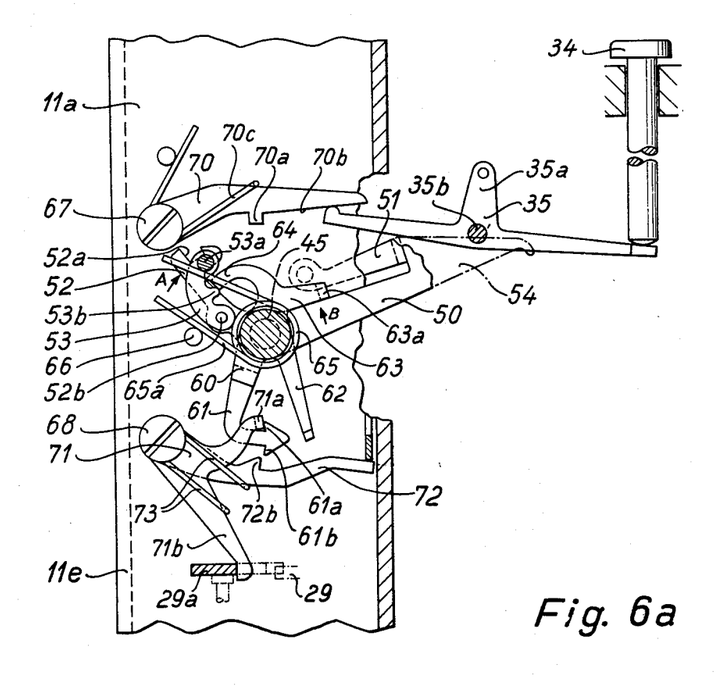

When the shutter release rod 34 is depressed, the locking lever 70 is pivoted against the force of its spring 70c by means of the lever 35 whereupon the projection 70a is disengaged from the blocking slot 52a of the lever arm 52 of the main lever 50. (FIGURES 4a and 6a.) At the same time, the crank lever 36 is moved into its operative position with respect to the pawl 33.

With the release of the lever arm 52 and the main lever 50, the driving spring 65 is untensioned so that its spring arm 65b acts against the pin 53a in the direction of arrow A on FIGURES 4a and 6a. This causes the coupling lever 53 to rotate around the end of the coupling arm 64 through the projection 53b since the auxiliary lever 60 is still blocked. The coupling lever 53 thus pivots the lever arm 52 of the main lever 50 around the shaft 45 in the direction of the arrow B through the pivot point connection 52b. This pivoting movement of the main lever 50 is transmitted to the crank 42 through the lever arm 51 and the control lever 44. The crank 42 then pivots the mirror 40 about the shaft 12 into the exposure position by the interaction of the crank pin 42a in the guide slot 41. This position is illustrated in FIGURES 6 and 6a.

When the mirror 40 reaches its exposure position, it engages the lever arm 36a of the crank lever 36 and pivots the lever 36 about its pivot point so that the lever arm 36b disengages the pawl 33 from the cam 32a of the blocking plate 32. This releases the control roller 30 and, accordingly, the shutter plates 20a and 20b are released one after the other according to the exposure time as adjusted at the exposure time adjusting member 16.

Simultaneously with the pivoting of the mirror 40 into the exposure position, the lever arm 54 moves from the position shown in FIGURE 4 into the position shown in FIGURE 6. Under the action of the spring 97 the diaphragm adjusting ring 91 will rotate following the upward movement of the lever arm 54 until the stop member 91a engages the pin 93b. At this point the opening of the diaphragm 19a corresponds to the preselected diaphragm opening. Thus, after the shutter was released by the pivoting of the mirror 40 into the exposure position, the exposure of the photograph occurs with the exposure time as preselected by adjustment of the member 16 and with the diaphragm opening as preselected by the diaphragm preselection ring 93.

In the exposure position of the mirror 40 the crank pin 42a is now in the upper dead center position of the crank 42. The pivoting movement of the main lever 50 is stopped by the stop member 63a of the arm 63 of the auxiliary lever 60. This stop member 63a is held in position by the locking lever 71 which is still in the locking position so that the driving spring 65 cannot be further released.

Figure 7:
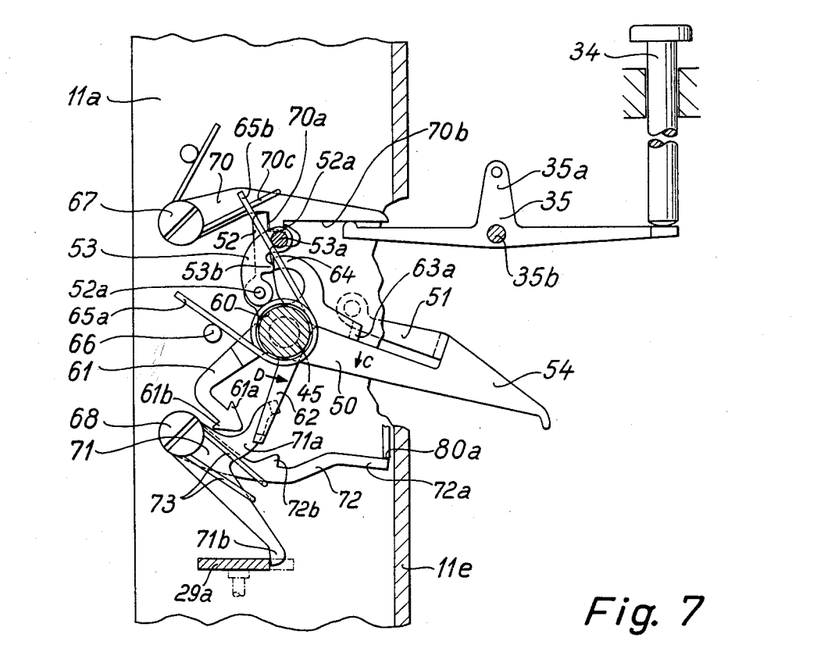
FIGURE 7 is a view similar to those of FIGURES 4a and 6a and showing the position of the components after the shutter has been operated and the mirror is being returned to the view-finder position.

The completion of the release of the second shutter plate 20b finishes the exposure process. The end of the release of this shutter plate operates the cam plate 29 so that the cam 29b thereon engages the switch lever 29a to pivot this lever and thereby pivot the locking lever 71 around its axis 68. This pivoting of the locking lever 71 disengages the arm 71a with the stop 61a of the lever arm 61 of the auxiliary lever 60 (FIGURE 7). This action releases the auxiliary lever 60 so that the driving spring 65 can be further released and thus pivots the main lever 50 in the direction of the arrow C through the stop arm 63. This pivoting of the main lever 50 continues until the projection 70a of the locking lever 60 again engages the blocking slot 52a of the lever arm 52 of the main lever 50.

As a result of this movement the mirror 40 is returned to its view-finder position as shown in FIGURE 4 and the diaphragm 19a, under the effect of lever arm 54 of the main lever 50, is again returned to its maximum opened position while simultaneously cocking the spring 97. The movement of the mirror 40 from its exposure position also releases the lever arm 36a of the crank lever 36 so as to permit the pawl 33 to again engage the cam 32a under the action of the spring 33b.

In order to make a new exposure with the camera, the operating handle 22 must be actuated to cock the shutter and to feed a new piece of film into the range of the image window 11f. At the end of this cocking and film-feeding movement the pawl 33 again engages the cam 32a under the action of its spring 33b and thus blocks the control roller 30 and the shutter 20 from being released.

The rotation of the main operating shaft 25 of the shutter actuating mechanism brings the cam 25a into engagement with the tensioning arm 62 of the auxiliary lever 60. Accordingly, the auxiliary lever 60 is pivoted in the direction of the arrow D from the position as shown in FIGURE 7 into the position illustrated in FIGURE 4a until the locking lever 71 is again engaged with the stop 61a of the lever arm 61 by its arm 71a.

Simultaneously therewith the driving spring 65 is again cocked by the coupling arm 64 acting upon the coupling lever 53 so that the coupling lever 53 pivots around the pivot point 52b and the stop arm 63 is disengaged from the main lever 50.

Upon releasing the operating lever 22 this lever, together with the main shaft 25, return to their original starting positions under the action of the return spring 22a. The camera is now again ready for an exposure.

(b) Elimination of the return of the mirror to the view-finder position after an exposure.

In order that the mirror will remain in the exposure position after an exposure and will not return to the view-finder position, the adjustable slide bar 80 is moved upwardly one notch into the position as shown in FIGURE 8. This enables the locking lever 72 to engage the stop 61b on the auxiliary lever 60.

If the camera release rod 34 is now depressed, all the functions relating to the movement of the mirror to the exposure position and the adjustment of the diaphragm as well as the shutter release, will occur as described above in detail under (a).

As described above, the locking lever 71 will again be actuated by the switch lever 29a, but this is without any effect since the locking lever 72 blocks the movement of the auxiliary lever 60. As a result, the mirror 40 will remain in the exposure position and will not return to the view-finder position even upon another cocking of the shutter.

Since the mirror 40 in its exposure position has carried out its function with respect to the position of the crank lever 36, the shutter can be released after each additional cocking thereof by depressing the camera release rod 34.

The forward and reverse movement of the locking lever 60 which also occurs has no effect upon the mirror 40 because the position of the mirror is also blocked by the blocking of the auxiliary lever 60 by the engagement of the stop arm 63 with the main lever 50.

(c) Removal of the mirror from the exposure path of light rays entering the objective.

Under certain photographic circumstances it may be desirable to position the mirror 40 beyond the exposure path of light rays entering through the objective. To achieve this, the adjustable slide bar 80 is moved into its uppermost position, as indicated in the dashed lines of FIGURE 8, by operating the cam 81. This upward movement of the slide bar 80 will disengage the locking lever 70 from the lever arm 52 of the main lever 50. Concurrently therewith auxiliary locking lever 72 remains in engagement with the lever arm 61 of the auxiliary lever 60.

Immediately upon the disengagement of the locking lever 70 from the main lever arm 52, the lever drive mechanism will be released so that the mirror 40 will be moved into its exposure position and will remain there. Subsequent cocking of the shutter and feeding of the film will not effect the mirror pivoting mechanism since this lever system is rendered ineffective by the positioning of the slide bar 80.

This above-described elimination of the function of the mirror can also be accomplished automatically instead of the adjusting cam as described. This can be done by providing a suitable cam surface on an objective which requires the elimination of the mirror from the exposure path of the light rays. Thus, upon the insertion of this objective in the camera casing, the cam surface will move the slide bar into its uppermost position so that the mirror is immediately moved to its exposure position solely by the mounting of a proper objective onto the casing.

*Modifications*

Figure 9:
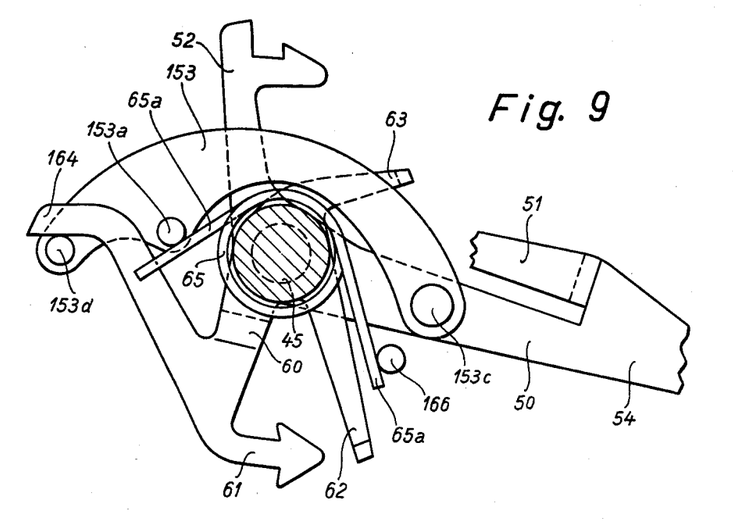
FIGURES 9 and 10 are elevational views in somewhat enlarged scale of the main and auxiliary levers and showing modifications of the coupling therebetween.
Figure 10:
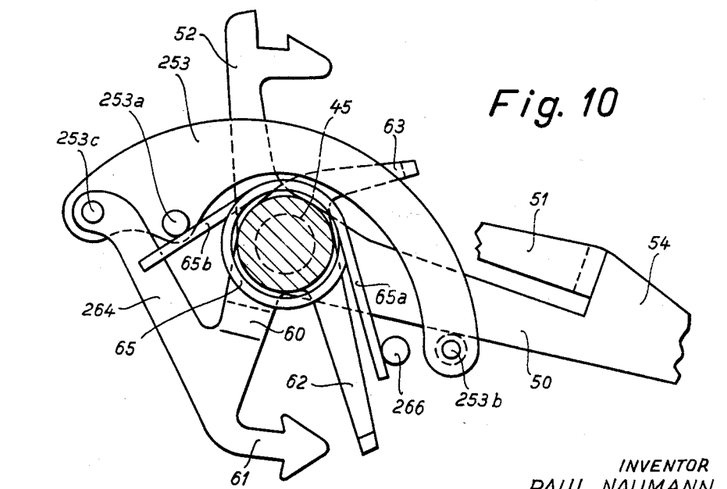

The arrangement and construction of the coupling lever 53 with respect to the connection between the main lever 50 and the auxiliary lever 60 can be modified in a number of ways without changing the function of this lever and with the application of forces in this lever arrangement remaining substantially the same. FIGURES 9 and 10 illustrate two modifications of this coupling arrangement between the main lever 50 and the auxiliary lever 60.

In the modification of FIGURE 9 a coupling lever 153 is pivotally mounted at one end thereof at the pivot 153c on the main lever 50. The other end of the coupling lever 153 has a pin 153d which is engageable by the coupling arm 164 of the auxiliary lever 60. The sole driving spring 65 has one arm 65a biassed against the stationary stop 166 and its other spring arm 65b acts against an abutment 153a on the coupling lever 153 between the pivot point 153c and the pin 153d. The remaining levers are constructed as described in connection with the embodiment as illustrated in FIGURES 1 through 8.

In the modification of FIGURE 10 the coupling lever 253 is pivotally mounted at 253c on the lever arm 264 of the auxiliary lever 60. A pin 253b is provided on the other end of the lever 253 and is engageable with the main lever 50. Spring arm 65b of the sole driving spring 65 engages the stop pin 253a on the coupling lever 253 between the pivot point 253c and the pin 253b.

In both modifications shown in FIGURES 9 and 10 the modified coupling levers 153 and 253 act under the force of the driving spring 65 in the similar manner as described above for the function of the coupling lever 53 in the embodiment according to FIGURES 1 through 8.

Thus it can be seen that the present invention provides a monocular reflex camera having a simplified mechanism for pivoting the mirror between the view finder and exposure positions. Further, this lever system is characterized by having a single driving spring to furnish the source of power for operating the lever system wherein the mirror can operate in any one of several different ways.

It will be understood that this invention is susceptible to modification in order to adapt it to different usages and conditions and, accordingly, it is desired to comprehend such modifications within this invention as may fall within the scope of the appended claims.

What is claimed as this invention is:

1. A monocular reflex camera comprising a casing having an objective lens and a view finder arrangement, a mirror pivotally mounted in said casing and having a viewing position to reflect the light rays entering said objective onto said view finder arrangement and an exposure position wherein said mirror is pivoted out of the path of said light rays, said mirror having a frame with a slot therein, there being a shutter in said casing in the path of light rays entering said objective, means on said casing for releasing said shutter, a main lever pivotally mounted on said casing and a crank lever operatively connected to said main lever with said crank lever having a pin slidably received in said mirror frame slot, the end positions of said crank lever in said slot corresponding to the dead center positions of said crank lever opposing said slot and defining the viewing and exposure positions of said mirror, and means including a driving spring and a lever system operatively connected to said main lever for pivoting said main lever in response to the actuation of said shutter releasing means so that said mirror is pivoted.

2. A monocular reflex camera comprising a casing having an objective lens and a view finder arrangement, a mirror pivotally mounted in said casing and having a viewing position to reflect the light rays entering said objective onto said view finder arrangement and an exposure position wherein said mirror is pivoted out of the path of said light rays, said mirror having a frame with a slot therein, there being a shutter in said casing in the path of light rays entering said objective, means on said casing for releasing said shutter, a main lever having a lever arm extending therefrom and pivotally mounted on said casing, a crank lever pivotally mounted on said casing and having a pin slidably received in said mirror frame slot, the end positions of said crank lever in said slot corresponding to the dead center positions of said crank lever opposing said slot and defining the viewing and exposure positions of said mirror, a control lever pivotally interconnecting said crank and main levers, an auxiliary lever pivotally mounted on said casing coaxially with said main lever, a coupling lever drivingly interconnecting said lever arm of said main lever and said auxiliary lever, a driving spring in operative engagement with said coupling lever, and means operatively connecting said main lever and said shutter releasing means for pivoting said main lever in response to the actuation of said shutter releasing means so that said mirror is pivoted.

3. A monocular reflex camera comprising a casing having an objective lens and a view finder arrangement, an adjustable objective diaphragm, means for adjusting said diaphragm to a predetermined opening, a mirror pivotally mounted in said casing and having a viewing position to reflect the light rays entering said objective onto said view finder arrangement and an exposure position wherein said mirror is pivoted out of the path of said light rays, said mirror having a frame with a slot therein, there being a shutter in said casing in the path of light rays entering said objective, means on said casing for releasing said shutter, a main lever pivotally mounted on said casing and a crank lever operatively connected to said main lever with said crank lever having a pin slidably received in said mirror frame slot, the end positions of said crank lever in said slot corresponding to the dead center positions of said crank lever opposing said slot and defining the viewing and exposure positions of said mirror, said main lever having an actuating arm operatively connected to said diphragm adjusting means, and means including a driving spring and a lever system operatively connected to said main lever for pivoting said main lever in response to the actuation of said shutter releasing means so that said mirror is pivoted simultaneously with the adjusting of said diaphragm opening.

4. A monocular reflex camera comprising a casing having an objective lens and view finder arrangement, a mirror pivotally mounted in said casing and having a viewing position to reflect the light rays entering said objective onto said view finder arrangement and an exposure position wherein said mirror is pivoted out of the path of said light rays, said mirror having a frame with a slot therein, there being a shutter in said casing in the path of light rays entering said objective, means on said casing for releasing said shutter, a main lever having a lever arm extending therefrom and pivotally mounted on said casing, a crank lever pivotally mounted on said casing and having a pin slidably received in said mirror frame slot, the end positions of said crank lever in said slot corresponding to the dead center positions of said crank lever opposing said slot and defining the viewing and exposure positions of said mirror, a control lever pivotally interconnecting said crank and main levers, an auxiliary lever pivotally mounted on said casing coaxially with said main lever, a coupling lever drivingly interconnecting said lever arm of said main lever and said auxiliary lever, a straight torsion spring coaxially mounted with said main and auxiliary levers and having one arm fixedly connected to said casing and a second arm operatively urging against said coupling lever, and means operatively connecting said main lever and said shutter releasing means for pivoting said main lever in response to the actuation of said shutter releasing means so that said mirror is pivoted.

5. A monocular reflex camera comprising a casing having an objective lens and a view finder arrangement, a mirror piovtally mounted in said casing and having a viewing position to reflect the light rays entering said objective onto said view finder arrangement and an exposure position wherein said mirror is pivoted out of the path of said light rays, said mirror having a frame with a slot therein, there being a shutter in said casing in the path of light rays entering said objective, means on said casing for releasing said shutter, a main lever having a lever arm extending therefrom and pivotally mounted on said casing, a crank lever pivotally mounted on said casing and having a pin slidably received in said mirror frame slot, the end positions of said crank lever in said slot corresponding to the dead center positions of said crank lever opposing said slot and defining the viewing and exposure positions of said mirror, a control lever pivotally interconnecting said crank and main levers, an auxiliary lever pivotally mounted on said casing coaxially with said main lever and having a lever arm extending therefrom, a coupling lever drivingly interconnecting said lever arm of said main lever and said auxiliary lever, a driving spring in operative engagement with said coupling lever, a first locking lever engageable with said main lever arm and a second locking lever engageable with said auxiliary lever arm, said locking levers being mounted on a wall of said casing, and means for selectively actuating said locking levers in response to the actuation of said shutter releasing means so that said mirror is pivoted.

6. A monocular reflex camera comprising a casing having an objective lens and a view finder arrangement, a mirror pivotally mounted in said casing and having a viewing position to reflect the light rays entering said objective onto said view finder arrangement and an exposure position wherein said mirror is pivoted out of the path of said light rays, said mirror having a frame with a slot therein, there being a shutter in said casing in the path of light rays entering said objective, means on said casing for releasing said shutter, a main lever having a lever arm extending therefrom and pivotally mounted on said casing, a crank lever pivotally mounted on said casing and having a pin slidably received in said mirror frame slot, the end positions of said crank lever in said slot corresponding to the dead center positions of said crank lever opposing said slot and defining the viewing and exposure positions of said mirror, a control lever pivotally interconnecting said crank and main levers, an auxiliary lever pivotally mounted on said casing coaxially with said main lever and having a lever arm extending therefrom, a coupling lever drivingly interconnecting said lever arm of said main lever and said auxiliary lever, a driving spring in operative engagement with said coupling lever, a first locking lever engageable with said main lever arm and a second locking lever engageable with said auxiliary lever arm, said locking levers being pivotally mounted on a wall of said casing on diametrically opposed sides of said main lever pivot point, an auxiliary locking lever pivotally mounted coaxially with said second locking lever but independent thereof and engageable with said auxiliary lever, an adjustable sliding bar for determining the operation of said second and auxiliary locking levers, and means for selectively actuating said first and second locking levers in response to the actuation of said shutter releasing means so that said mirror is pivoted.

7. A monocular reflex camera comprising a casing having an objective lens and a view finder arrangement, a mirror pivotally mounted in said casing and having a viewing position to reflect the light rays entering said objective onto said view finder arrangement and an exposure position wherein said mirror is pivoted out of the path of said light rays, said mirror having a frame with a slot therein, there being a shutter in said casing in the path of light rays entering said objective, means on said casing for releasing said shutter, a main lever having a lever arm extending therefrom and pivotally mounted on said casing, a crank lever pivotally mounted on said casing and having a pin slidably received in said mirror frame slot, the end positions of said crank lever in said slot corresponding to the dead center positions of said crank lever opposing said slot and defining the viewing and exposure positions of said mirror, a control lever pivotally interconnecting said crank and main levers, an auxiliary lever pivotally mounted on said casing coaxially with said main lever and having a lever arm extending therefrom, a coupling lever drivingly interconnecting said lever arm of said main lever and said auxiliary lever, a driving spring in operative engagement with said coupling lever, a first locking lever engageable with said main lever arm and a second locking lever engageable with said auxiliary lever arm, said locking levers being pivotally mounted on a wall of said casing on diametrically opposed sides of said main lever pivot point, an auxiliary locking lever pivotally mounted coaxially with said second locking lever but independent thereof and engageable with said auxiliary lever, an adjustable sliding bar for determining the operation of said second and auxiliary locking levers, means for selectively actuating said first and second locking levers in response to the actuation of said shutter releasing means so that said mirror is pivoted, and means for selectively positioning said sliding bar in any one of a plurality of operating positions wherein the first position disengages the auxiliary locking lever from the auxiliary lever, the second operating position engages the auxiliary locking lever with the auxiliary lever to prevent the return of the mirror to its viewing position after actuation of the shutter, and the third operating position disengages the first locking lever from the main lever for retaining the mirror in its exposure position.

8. A monocular reflex camera comprising a casing having an objective lens and a view finder arrangement, a mirror pivotally mounted in said casing and having a viewing position to reflect the light rays entering said objective onto said view finder arrangement and an exposure position wherein said mirror is pivoted out of the path of said light rays, said mirror having a frame with a slot therein, there being a shutter in said casing in the path of light rays entering said objective, means including an operating shaft for tensioning said shutter, there being a cam on said operating shaft, means on said casing for releasing said shutter, a main lever having a lever arm extending therefrom and pivotally mounted on said casing, the pivot axis of said main lever being perpendicular to said operating shaft and intersecting the same by an extension thereof, a crank lever pivotally mounted on said casing and having a pin slidably received in said mirror frame slot, the end positions of said crank lever in said slot corresponding to the dead center positions of said crank lever opposing said slot and defining the viewing and exposure positions of said mirror, a control lever pivotally interconnecting said crank and main levers, an auxiliary lever pivotally mounted on said casing coaxially with said main lever, a tensioning arm extending from said auxiliary lever and engageable with said operating shaft cam to actuate the same whereby said shutter is tensioned, a coupling lever drivingly interconnecting said main lever arm and said auxiliary lever, a driving spring in operative engagement with said coupling lever, and means operatively connecting said main lever and said shutter releasing means for pivoting said main lever in response to the actuation of said shutter releasing means so that said mirror is pivoted.

9. A monocular reflex camera comprising a casing having an objective lens and a view finder arrangement, a mirror pivotally mounted in said casing and having a viewing position to reflect the light rays entering said objective onto said view finder arrangement and an exposure position wherein said mirror is pivoted out of the path of said light rays, said mirror having a frame with a slot therein, there being a shutter having first and second shutter plates in said casing in the path of light rays entering said objective, means on said casing for releasing said shutter, a main lever having a lever arm extending therefrom and pivotally mounted on said casing, a crank lever pivotally mounted on said casing and having a pin slidably received in said mirror frame slot, the end positions of said crank lever in said slot corresponding to the dead center positions of said crank lever opposing said slot and defining the viewing and exposure positions of said mirror, a control lever pivotally interconnecting said crank and main levers, an auxiliary lever pivotally mounted on said casing coaxially with said main lever and having a lever arm extending therefrom, a coupling lever drivingly interconnecting said lever arm of said main lever and said auxiliary lever, a driving spring in operative engagement with said coupling lever, a first locking lever engageable with said main lever arm and a second locking lever engageable with said auxiliary lever arm, said locking levers being pivotally mounted on a wall of said casing on diametrically opposed sides of said main lever pivot point, an auxiliary locking lever pivotally mounted coaxially with said second locking lever but independent thereof and engageable with said auxiliary lever, a cam plate drivingly connected to said second shutter plate and engageable with said second locking lever and actuated by the run-off of said second shutter plate to cause said second locking lever to lock said auxiliary lever, and means for selectively actuating said first and second locking levers in response to the actuation of said shutter releasing means so that said mirror is pivoted.

10. A monocular reflex camera comprising a casing having an objective lens and a view finder arrangement, a mirror pivotally mounted in said casing and having a viewing position to reflect the light rays entering said objective onto said view finder arrangement and an exposure position wherein said mirror is pivoted out of the path of said light rays, said mirror having a frame with a slot therein, there being a shutter in said casing in the path of light rays entering said objective, means operatively connected to said shutter and including blocking plate for actuating the same, means on said casing for releasing said shutter to actuate the same, a main lever pivotally mounted on said casing and a crank lever operatively connected to said main lever with said crank lever having a pin slidably received in said mirror frame slot, the end positions of said crank lever in said slot corresponding to the dead center positions of said crank lever opposing said slot and defining the viewing and exposure positions of said mirror, means including a driving spring and a lever system operatively connected to said main lever for pivoting said main lever in response to the actuation of said shutter releasing means so that said mirror is pivoted, a T-shaped lever pivotally mounted on said casing and one cross arm thereof being engageable by said shutter releasing means when said means is operated, a crank lever pivotally mounted on the stem of said T-lever and having one leg of said crank lever extending into the range of pivoting movement of said mirror and another leg, and a pawl engageable by said another leg of said crank lever and locking said blocking plate so that said shutter actuating means is inoperative.

11. A monocular reflex camera comprising a casing having an objective lens and a view finder arrangement, a mirror pivotally mounted in said casing and having a viewing position to reflect the light rays entering said objective onto said view finder arrangement and an exposure position wherein said mirror is pivoted out of the path of said light rays, said mirror having a frame with a slot therein, there being a shutter in said casing in the path of light rays entering said objective, means on said casing for releasing said shutter, a main lever having a lever arm extending therefrom and pivotally mounted on said casing, a crank lever pivotally mounted on said casing and having a pin slidably received in said mirror frame slot, the end positions of said crank lever in said slot corresponding to the dead center positions of said crank lever opposing said slot and defining the viewing and exposure positions of said mirror, a control lever pivotally interconnecting said crank and main levers, an auxiliary lever pivotally mounted on said casing coaxially with said main lever, a coupling lever with the ends thereof pivotally connected to said main and auxiliary levers, a driving spring in operative engagement with said coupling lever, and means operatively connecting said main lever and said shutter releasing means for pivoting said main lever in response to the actuation of said shutter releasing means so that said mirror is pivoted.

12. A monocular reflex camera comprising a casing having an objective lens and a view finder arrangement, a mirror pivotally mounted in said casing and having a viewing position to reflect the light rays entering said objective onto said view finder arrangement and an exposure position wherein said mirror is pivoted out of the path of said light rays, said mirror having a frame with a slot therein, there being a shutter in said casing in the path of light rays entering said objective, means on said casing for releasing said shutter, a main lever having a lever arm extending therefrom and pivotally mounted on said casing, a crank lever pivotally mounted on said casing and having a pin slidably received in said mirror frame slot, the end positions of said crank lever in said slot corresponding to the dead center positions of said crank lever opposing said slot and defining the viewing and exposure positions of said mirror, a control lever pivotally interconnecting said crank and main levers, an auxiliary lever pivotally mounted on said casing coaxially with said main lever and having a lever arm extending therefrom, a coupling lever drivingly interconnecting said lever arm of said main lever and said auxiliary lever, a driving spring in operative engagement with said coupling lever, a first locking lever engageable with said main lever arm and a second locking lever engageable with said auxiliary lever arm, said locking levers being pivotally mounted on a wall of said casing on diametrically opposed sides of said main lever pivot point, an auxiliary locking lever pivotally mounted coaxially with said second locking lever but independent thereof and engageable with said auxiliary lever, an adjustable sliding bar for determining the operation of said second and auxiliary locking levers, means for selectively actuating said first and second locking levers in response to the actuation of said shutter releasing means so that said mirror is pivoted, and means on said objective lens for adjusting said sliding bar in accordance with the characteristics of the lens whereby the selective operation of said locking levers is determined.

References Cited in the file of this patent
UNITED STATES PATENTS

| | | |
|---|---|---|
| 2,579,247 | Angenieux | Dec. 18, 1951 |
| 2,677,997 | Graf | May 11, 1954 |
| 2,730,025 | Faulhaber | Jan. 10, 1956 |